March 31, 1959  E. HOFFMANN ET AL  2,879,916
LOCKING ASSEMBLY FOR RECEPTACLE CLOSURES
Filed July 31, 1956  2 Sheets-Sheet 1

INVENTORS
ERNEST HOFFMANN
CLAUDE D. GRESHAM

BY
ATTORNEYS

March 31, 1959 E. HOFFMANN ET AL 2,879,916
LOCKING ASSEMBLY FOR RECEPTACLE CLOSURES
Filed July 31, 1956 2 Sheets-Sheet 2
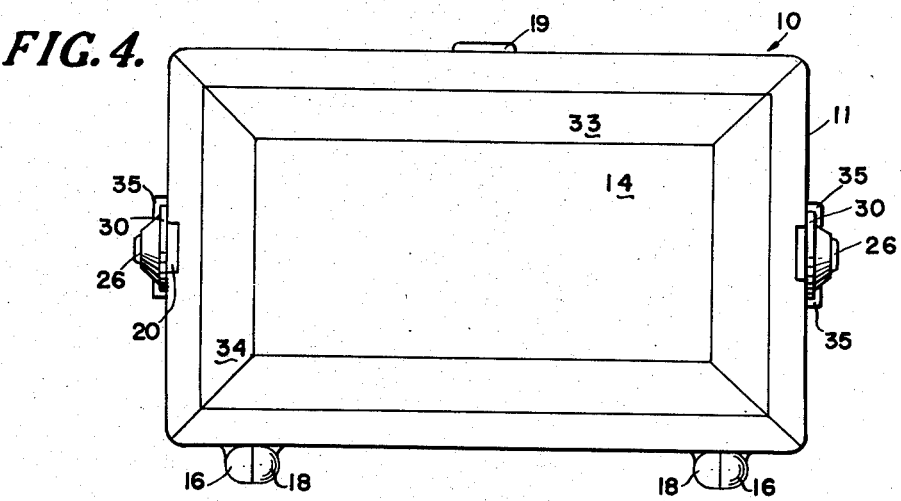
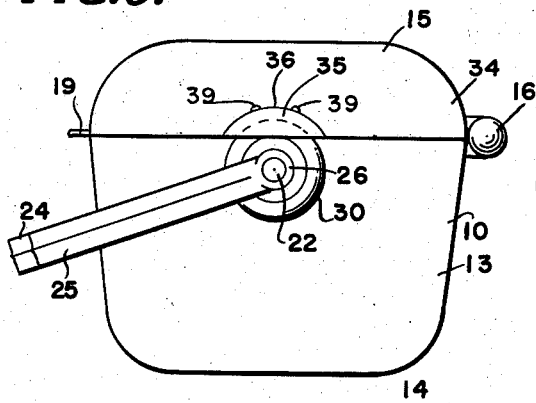
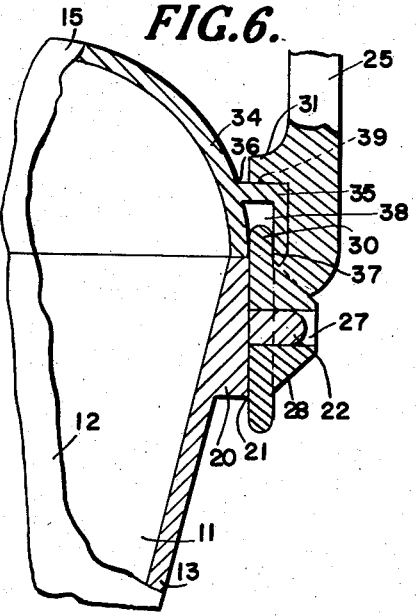
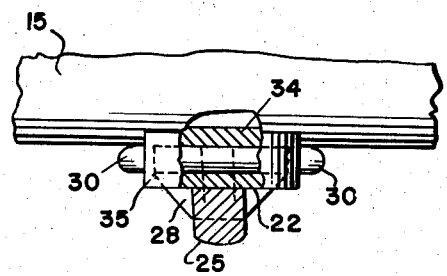
INVENTORS
ERNEST HOFFMANN
CLAUDE D. GRESHAM
BY
ATTORNEYS

United States Patent Office 2,879,916
Patented Mar. 31, 1959

2,879,916

LOCKING ASSEMBLY FOR RECEPTACLE CLOSURES

Ernest Hoffmann and Claude D. Gresham, Omaha, Nebr., assignors to Tip-Top Products Company, Omaha, Nebr., a corporation of Nebraska Application July 31, 1956, Serial No. 601,213

7 Claims. (Cl. 220—96)

The present invention relates to locking attachments for containers, such as ladies' handbags and the like.

An important object consists in associating with the cover of a lady's handbag or the like, a simple, efficient, economical, and compact locking assembly which, when the container or bag is closed by the cover and the handle is moved to an upright or carrying position, provides releasable means on the handle engageable with the cover for maintaining the latter in its closed position.

Another object is to provide the container with a detachable handle having means coacting with complementary means on the cover for preventing the dislocation or disconnection of the handle from the bag or container when the bag is closed by the cover.

A further object consists in providing at least one arm of the detachable handle with spaced means arranged to coact with complementary means on the cover when the latter is in its closed position, for simultaneously locking or maintaining the cover in a fixed position relative to the container and for preventing the accidental disconnection of the handle from the container.

Another object consists in forming a removable closure of a container with a curved shoulder portion or member having a transverse base and positioned so as to engage spaced means on a detachable handle pivotally connected to the container, so as to provide releasable locking means for securing the closure to the container; and also means for maintaining the handle in an upright position and for preventing the dislocation or disconnection of the handle from the container when the handle is moved a predetermined distance to its lifting and carrying position.

Other objects and advantages of the invention will become apparent from the following description when taken in conjunction with the accompanying claims and drawings.

Referring to the drawings:

Figure 4 is a bottom plan view of the container;

Figure 5 is an end view of Figure 1, with the handle moved to its inoperative or side position;

Figure 6 is an enlarged sectional view taken substantially along the lines 6—6 of Figure 3;

Figure 7 is an enlarged sectional view taken substantially along the line 7—7 of Figure 2.

Figure 1:
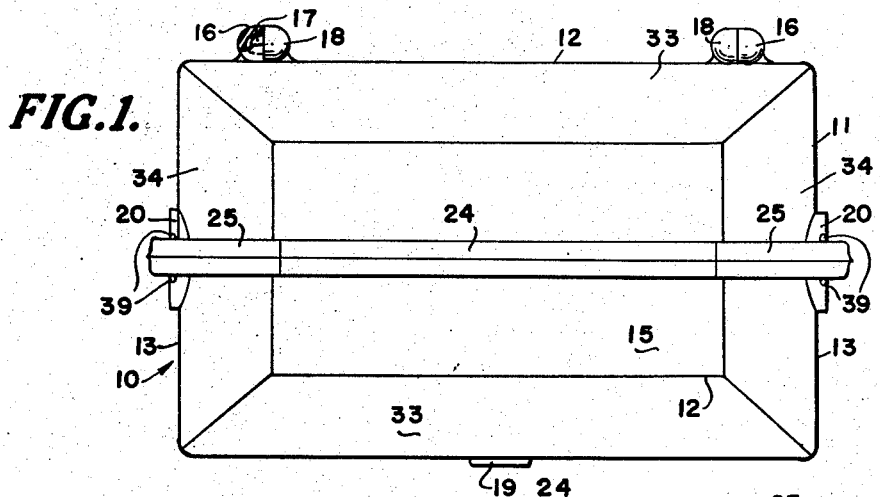
Figure 1 is a plan view of a container, such as a ladies' handbag, provided with a locking assembly constructed in accordance with the present invention, and showing the handle in its upright position.
Figure 2:
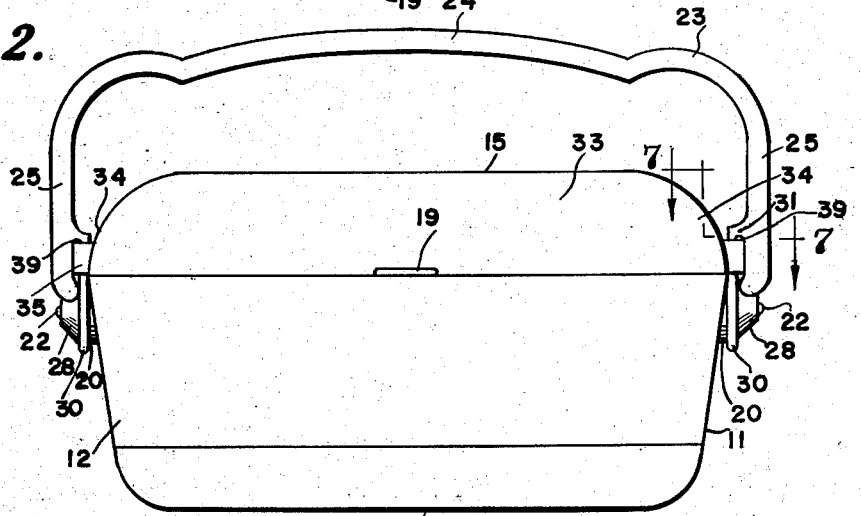
Figure 2 is a side view of Figure 1.

Referring to the drawings, 10 indicates a container which, for the purpose of illustration, is shown in the form of a plastic ladies' handbag of substantially rectangular shape. Manifestly, the container or bag may be of any suitable size and shape and formed of any light, durable material capable of withstanding the uses to which a device of this character is normally subjected. The plastic container or handbag 10 includes a body 11 having the spaced parallel sides 12 connected by end portions 13 and which may be formed of any suitable colored plastic in a mold or the like. As shown, the sides 12 and ends 13 are inclined or tapered downwardly so as to be connected to the bottom 14 (Fig. 2). The top of the container is opened and is arranged to be closed preferably by a transparent cover or lid 15 of substantially the same size and shape as the upper side walls of the container. The cover 15 on one side, may be formed with hollow or recessed longitudinally spaced lugs 16 arranged to receive pins 17 extending outwardly and longitudinally from complementary formed lugs 18 on the adjacent side of the container 10, so as to provide a hinge connection of the cover with the container (Fig. 1). The opposite side of the cover intermediate its length may be provided with a tab 19 for facilitating the manual opening of the hinged cover when the latter is in its closed position. If desired, the hinge connection may be omitted so that the cover 15 is bodily removable from the container 10.

Figure 8:
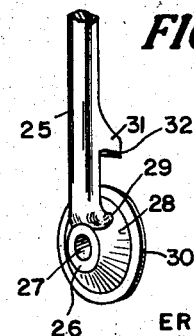
Figure 8 is a detailed perspective view of an end portion of the handle disconnected from the container.

Each end 13 of the container or bag 10 may be provided adjacent the top and substantially centrally of the container, with an outwardly and laterally extending portion 20 having a smooth flat outer vertical surface 21 (Fig. 6) provided with a centrally disposed trunnion 22. A flexible handle or bail 23 preferably formed of the same plastic material as the body 10 and of the same color, has an intermediate longitudinally extending portion 24 of substantially the same length as the container, and terminates in the depending end portions or arms 25 that are sufficiently flexible or yieldable as to be detachably connected to the trunnions 22 when the parts are assembled. Each of the depending arms 25 of the handle has an integral hub or boss 26 having a transverse opening 27 (Fig. 8) for receiving a trunnion when the detachable handle is connected to the container. The hub 26 has a conical or tapered peripheral outer portion 28 to which a depending arm 25 is connected as at 29. The tapered portion 28 diverges inwardly relative to the arm 25 of the handle and terminates in a thin peripheral or annular disc flange 30. Thus, it will be seen that, when the arms 25 of the handle 24, are swung about the trunnions 22, the hubs 26 and their associated parts are rotated with the handle. Each of the arms 25 above the hub 26 and spaced therefrom is provided on its inner surface with a transversely disposed lug 31 having a flat bottom surface 32 (Fig. 8).

Figure 3:
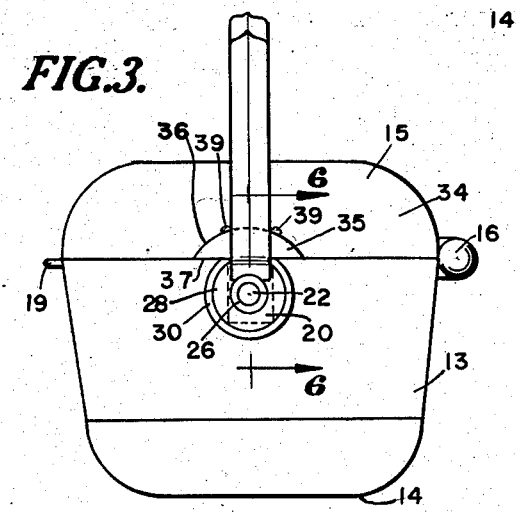
Figure 3 is an end view of Figure 1.

The cover 15 may be provided with curved depending sides 33 and similarly shaped curved ends 34 (Fig. 1). Each of the curved end portions 34 centrally thereof and adjacent its lower edge, preferably has an integrally and arcuately shaped member or portion 35 extending outwardly and laterally therefrom (Fig. 6). The member 35 is formed with a curved shoulder 36 connected by a transverse base 37 formed with a recess or groove 38 for receiving the thin annular flange 30 of the hub 26 when the cover 15 is moved to its closed position. The inwardly extending lugs 31 on the depending arms 25 of the handle 24 are positioned to slidably engage the curved shoulders 36 when the handle is swung from its inoperative position, as shown in Figure 5, to its upright or operative position, as shown in Figure 2. Each of the curved shoulders 36 has a pair of spaced rounded projections or beads 39 (Fig. 3) positioned in the path of movement of the lug 31 and on opposite sides thereof, over which the bottom surface 32 of the lug is yieldably movable so as to confine the handle 24 in its vertical or upright position (Fig. 3), between the spaced beads 39, when the handle has been swung upwardly a predetermined distance.

Thus, it will be seen that, when the cover or lid 15 is moved to close the container, the recess 38 in each of the members 35 overlaps the adjacent segmental portion of the flanged disc 30 on the hub 26, so as to permit free rotation of the flanged disc 30 within the recess but provides a stop or abutment for preventing its lateral removal therefrom. When the handle 24 is swung from its inoperative position (Fig. 5) at the side of the container or handbag, to its vertical or upright position, each of the lugs 31 rides over the curved shouldered portion 36 of the member 35 and snaps over the adjacent yieldable bead 39, so as to be confined between it and the bead 29 on the opposite side of the arm 25, in order to yieldably maintain the handle or bail 24 in its upright carrying position. The disc 30 is freely rotatable within the recess 38 so that the handle 23 is also freely rotatable relative to the container and the cover when the latter is in its closed position. In other words, the handle 23 is prevented from being removed from the container when the cover is in its closed position without interfering with the free swinging movement of the handle relative to the container and the closed cover.

It will be seen that a unique locking or clamping assembly is provided having a minimum number of parts and which accomplishes the dual function of preventing the cover 15, when in its closed position from accidentally becoming loose or flying open, when the handle or operating member is moved to an upright or predetermined position. Additionally, the handle 24 is prevented from being disconnected from the container when the cover is applied. In other words, the handle can only be connected to or removed from the body when the cover is raised or swung away from the top. While the locking assembly is shown for carrying out both functions, it will be manifest that it may be used to either maintain a removable cover or lid on a container, or prevent a detachable handle or member from being accidentally disconnected from a receptacle. While the locking means are shown associated with both of the arms 25 of the handle, only one of the arms may be provided with the retaining means for maintaining the parts releasably in a fixed position. Moreover, the dual locking assembly may be with equal efficiency associated with various types of portable containers or receptacles, such as baskets, boxes, cartons, and the like.

As each of the flanges or retaining discs 30 extends slightly above the top of the body, it will fit within the adjacent recess or groove 38, when the cover is moved to its closed position, so as to prevent the withdrawal of the handle from the container.

It will be understood that the form of the invention shown is merely illustrative and that such changes may be made as come within the scope of the following claims.

We claim:

1. A container of the class described including a body having an open top, a cover for the top, a detachable handle having end portions pivotally connected to opposite sides of said body, each of said end portions having a flange projecting above the top of the body, said cover adjacent and above said flanges having recesses for receiving the flanges so as to prevent withdrawal of the detachable handle from the container when the cover is moved to close the container, said cover having a curved projection extending outwardly and laterally from at least one side thereof, and said handle having means releasably engageable with said projection when the handle is moved a predetermined distance for locking the cover to the body.

2. A container of the class described including a body having an open top, a cover for said top, opposite sides of said body having longitudinally aligned trunnions extending outwardly therefrom, a handle having spaced depending end portions, each of said end portions terminating in a hub having a central opening for receiving an adjacent trunnion, at least one side of said cover having a member extending outwardly therefrom and arranged to be positioned above one of said trunnions when the cover closes the body, said member having a curved shouldered surface, said handle having a lug engageable with said curved surface when the handle is moved to an upright position, means on said member for yieldably maintaining the handle in its upright position, and said hub having means movable therewith and coacting with complementary means on the outer adjacent side of the cover for preventing the removal of the handle from the container when the cover is in its closed position without interfering with the swinging movement of the handle relative to the container.

3. A container of the class described including a body having an open top, a cover for said top, opposite sides of said body having longitudinally aligned trunnions extending outwardly therefrom, a handle having spaced depending end portions, each of said end portions terminating in a hub having a central opening for receiving an adjacent trunnion so as to detachably connect the handle to the container, said cover having a member extending outwardly therefrom and arranged to be positioned over a trunnion when the cover is moved to close the top of the container, said member having means coacting with complementary engaging means on said handle for releasably maintaining the handle in an upright position, and said hub having means movable therewith and coacting with complementary means on the outer adjacent side of the cover for preventing the removal of the handle from the container when the cover is in its closed position without interfering with the swinging movement of the handle relative to the container and the closed cover.

4. A container of the class described including a body having an open top, a cover for said top, opposite sides of said body having longitudinally aligned trunnions extending outwardly therefrom, a handle having spaced depending end portions, each of said end portions terminating in a hub having a central opening for receiving an adjacent trunnion so as to detachably connect the handle to the container, said closure at each end thereof having a member extending outwardly therefrom and arranged to be positioned above and adjacent a trunnion when the cover is moved to close the top of the container, said member having a curved shoulder portion connected by a transverse base, said base having a recess in the bottom thereof, the hub of each of said end portions when connected to a trunnion having means coacting with complementary formed means on said member for maintaining the handle in an upright position, and means on said hub arranged to extend into said recess when the cover is moved to its closed position for preventing the disconnection of the handle from the container.

5. A container of the class described including a body having an open top, a cover for said top, opposite sides of said body having longitudinally aligned trunnions extending outwardly therefrom, a handle having spaced depending end portions, each of said end portions terminating in a hub having a central opening for receiving an adjacent trunnion so as to detachably connect the handle to the container, said closure at each end thereof having a member extending outwardly and centrally thereof and arranged to be positioned above and adjacent a trunnion when the cover is moved to close the top of the container, said member having an upwardly curved shoulder portion connected by a transverse base, said base having a recess therein, each of the end portions of said handle having an inwardly extending lug arranged frictionally to engage the curved shoulder portion of said member when the handle is moved to its upright position, and the hub of each of said end portions having a peripheral flange insertable within said recess when the handle is in its upright position for preventing the disconnection of the end portion of the handle from the container.

6. A container of the class described, including a body having an open top, a cover for the top having depending sides, a detachable handle having end portions pivotally connecting to opposite sides of said body, each of said end portions having a flange rotatable therewith and projecting above the top of the body, the opposite depending sides of said cover adjacent and above said flanges having recesses for receiving the flanges so as to prevent withdrawal of the detachable handle from the container when the cover is moved to close the container and without interfering with the swinging movement of the handle relative to the container.

7. A container, as called for in claim 6, in which at least one of the end portions of the handle has means releasably engageable with complementary means on the cover for maintaining the cover in a fixed position when the cover closes the top and the handle is rotated to an upright position relative thereto, and means for releasably maintaining the handle in its upright position.

References Cited in the file of this patent
UNITED STATES PATENTS

| | | |
|---|---|---|
| 308,174 | Krouse | Nov. 18, 1884 |
| 463,228 | Halliburton et al. | Nov. 17, 1891 |
| 896,026 | Larkin | Aug. 11, 1908 |
| 1,219,402 | Rutan | Mar. 13, 1917 |
| 1,351,325 | Catlin | Aug. 31, 1920 |
| 1,815,125 | Townsend | July 21, 1931 |
| 2,054,897 | Darling | Sept. 22, 1936 |
| 2,572,629 | Kolell | Oct. 23, 1951 |